(12) United States Patent
Erhan et al.

(10) Patent No.: US 9,514,389 B1
(45) Date of Patent: Dec. 6, 2016

(54) TRAINING A NEURAL NETWORK TO DETECT OBJECTS IN IMAGES

(71) Applicant: Google Inc., Mountain View, CA (US)

(72) Inventors: Dumitru Erhan, San Francisco, CA (US); Christian Szegedy, Sunnyvale, CA (US); Dragomir Anguelov, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/185,613

(22) Filed: Jun. 17, 2016

Related U.S. Application Data

(63) Continuation of application No. 14/528,815, filed on Oct. 30, 2014, now Pat. No. 9,373,057.

(60) Provisional application No. 61/899,124, filed on Nov. 1, 2013.

(51) Int. Cl.
*G06K 9/62* (2006.01)
*G06K 9/66* (2006.01)

(52) U.S. Cl.
CPC ........... *G06K 9/6256* (2013.01); *G06K 9/6202* (2013.01); *G06K 9/66* (2013.01)

(58) Field of Classification Search
USPC .......... 382/156, 157, 158, 159, 278; 706/15, 706/16, 25; 128/925
See application file for complete search history.

(56) References Cited

U.S. PATENT DOCUMENTS

| | | | | |
|---|---|---|---|---|
| 5,448,484 | A * | 9/1995 | Bullock | G06T 7/004 340/933 |
| 5,465,308 | A * | 11/1995 | Hutcheson | G06K 9/00221 382/156 |
| 6,549,646 | B1 | 4/2003 | Yeh et al. | |
| 6,671,400 | B1 | 12/2003 | Ekpar et al. | |
| 6,934,415 | B2 | 8/2005 | Stentiford | |
| 6,944,319 | B1 * | 9/2005 | Huang | G06K 9/6282 382/118 |
| 7,142,269 | B2 | 11/2006 | Ikeno et al. | |
| 7,142,697 | B2 * | 11/2006 | Huang | G06K 9/6282 340/5.52 |
| 7,333,963 | B2 * | 2/2008 | Widrow | G06F 17/30247 382/155 |
| 7,602,944 | B2 | 10/2009 | Campbell et al. | |

(Continued)

OTHER PUBLICATIONS

Alexe et al., "What is an object?" 2010 IEEE Conference on Computer Vision and Pattern Recognition (CVPR), Jun. 2010, pp. 73-80.

(Continued)

*Primary Examiner* — Yosef Kassa
(74) *Attorney, Agent, or Firm* — Fish & Richardson P.C.

(57) ABSTRACT

Methods, systems, and apparatus, including computer programs encoded on computer storage media, for training a neural network to detect object in images. One of the methods includes receiving a training image and object location data for the training image; providing the training image to a neural network and obtaining bounding box data for the training image from the neural network, wherein the bounding box data comprises data defining a plurality of candidate bounding boxes in the training image and a respective confidence score for each candidate bounding box in the training image; determining an optimal set of assignments using the object location data for the training image and the bounding box data for the training image, wherein the optimal set of assignments assigns a respective candidate bounding box to each of the object locations; and training the neural network on the training image using the optimal set of assignments.

20 Claims, 3 Drawing Sheets

(56) References Cited

U.S. PATENT DOCUMENTS

| | | | | |
|---|---|---|---|---|
| 7,660,437 B2* | 2/2010 | Breed | ............... | G06K 9/00369 382/100 |
| 8,254,691 B2* | 8/2012 | Kaneda | ............. | G06K 9/00744 382/103 |

OTHER PUBLICATIONS

Carreira and Sminchisescu, "Constrained parametric min-cuts for automatic object segmentation," 2010 IEEE Conference on Computer Vision and Pattern Recognition (CVPR), Jun. 2010, pp. 3241-3248.

Dean et al., "Fast, accurate detection of 100,000 object classes on a single machine," Proceedings of the 2013 IEEE Conference on Computer Vision and Pattern Recognition, 2013, pp. 1814-1821.

Endres and Hoiem, "Category independent object proposals," ECCV'10 Proceedings of the 11th European conference on Computer vision: Part V, 2010, pp. 575-588.

Everingham et al., "The pascal visual object classes (voc) challenge," International Journal of Computer Vision, 88(2):303-338, Jun. 2010.

Felzenszwalb et al., "Object detection with discriminatively trained part-based models," IEEE Transactions on Pattern Analysis and Machine Intelligence, 32(9):1627-1645, Sep. 2010.

Fischler and Elschlager, "The representation and matching of pictorial structures," IEEE Transactions on Computers, c-22(1):67-92, Jan. 1973.

Girshick et al., "Discriminatively trained deformable part models, release 5," Sep. 5, 2012 [retrieved on Nov. 3, 2014]. Retrieved from the Internet: URL<http://people.cs.uchicago.edu/rbg/latent-release5/>, 3 pages.

Gu et al., "Recognition using regions," 2009 IEEE Conference on Computer Vision and Pattern Recognition, CVPR 2009, Jun. 2009, pp. 1030-1037.

Krizhevsky et al., "ImageNet classification with deep convolutional neural networks," NIPS, pp. 1-9, 2012.

Lampert et al., "Beyond sliding windows: object localization by efficient subwindow search," IEEE Conference on Computer Vision and Pattern Recognition, 2008, CVPR 2008, Jun. 2008, pp. 1-8.

Song et al., "Sparselet models for efficient multiclass object detection," ECCV'12 Proceedings of the 12th European conference on Computer Visio—vol. Part II, 2012, pp. 802-815.

Szegedy et al., "Deep neural networks for object detection," In Advances in Neural Information Processing Systems (NIPS), 2013, pp. 1-9.

Van de Sande et al., "Segmentation as selective search for object recognition," 2011 IEEE International Conference on Computer Vision (ICCV), Nov. 2011, pp. 1879-1886.

Zhu et al., "Latent hierarchical structural learning for object detection," In 2010 IEEE Conference on Computer Vision and Pattern Recognition (CVPR), Jun. 2010, pp. 1062-1069.

* cited by examiner

TRAINING A NEURAL NETWORK TO DETECT OBJECTS IN IMAGES

CROSS-REFERENCE TO RELATED APPLICATIONS

This is a continuation of U.S. application Ser. No. 14/528,815, filed on Oct. 30, 2014, which claims priority to U.S. Provisional Application No. 61/899,124, filed on Nov. 1, 2013. The disclosures of the prior applications are considered part of and are incorporated by reference in the disclosure of this application.

BACKGROUND

This specification relates to detecting objects in images.

Deep neural networks are machine learning systems that employ multiple layers of models, where the outputs of lower level layers are used to construct the outputs of higher level layers.

SUMMARY

In general, one innovative aspect of the subject matter described in this specification can be embodied in methods that include the actions of receiving a training image and object location data for the training image, wherein the object location data identifies one or more object locations in the training image; providing the training image to a neural network and obtaining bounding box data for the training image from the neural network, wherein the bounding box data comprises data defining a plurality of candidate bounding boxes in the training image and a respective confidence score for each candidate bounding box in the training image; determining an optimal set of assignments using the object location data for the training image and the bounding box data for the training image, wherein the optimal set of assignments assigns a respective candidate bounding box to each of the object locations; and training the neural network on the training image using the optimal set of assignments.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Determining the optimal set of assignments can include performing a bipartite matching between the object locations and the candidate bounding boxes to select the optimal set of assignments. Performing the bipartite matching can include: selecting as the optimal set of assignments a set of assignments that minimizes a loss function that includes a localization loss term and a confidence loss term. The location loss term for a particular set of assignments can be based on, for each of the object locations, a distance in the training image between the object location and a candidate bounding box assigned to the object location by the particular set of assignments. The location loss term $F_{loc}$ for the particular set of assignments x can satisfy:

$$F_{loc}(x, l) = \sum_{i,j} \cdot 5 x_{ij} \|l_i - g_j\|_2^2,$$

wherein i ranges from 1 to a total number of candidate bounding boxes, j ranges from 1 to a total number of object locations, $l_i$ is an i-th candidate bounding box, $g_j$ is a j-th object location, $x_{ij}$ equals one if $l_i$ is assigned to $g_j$ in the particular set of assignments x and zero if $l_i$ is not assigned to $g_j$ in the particular set of assignments x, and $\|l_i - g_j\|_2$ is an $L_2$ distance between normalized coordinates of $l_i$ and normalized coordinates of $g_j$.

The confidence loss term for a particular set of assignments can be based on, for each candidate bounding box that is assigned to any of the object locations by the particular set of assignments, how close the confidence score for the candidate bounding box is to a first target confidence score for candidate bounding boxes that are assigned to object locations.

The confidence loss term for the particular set of assignments can be further based on, for each candidate bounding box that is not assigned to any of the object locations by the particular set of assignments, how close the confidence score for the candidate bounding box is to a second target confidence score for candidate bounding boxes that are not assigned to object locations, wherein the second target confidence score is lower than the first target confidence score.

The confidence loss $F_{con}$ for the particular set of assignments x can satisfy:

$$F_{con}(x, c) = -\sum_{i,j} x_{ij} \log(c_i) - \sum_i \left(1 - \sum_j x_{ij}\right) \log(1 - c_i),$$

where i ranges from 1 to a total number of candidate bounding boxes, j ranges from 1 to a total number of object locations, $c_i$ is a confidence score for an i-th candidate bounding box, and $x_{ij}$ equals one if $l_i$ is assigned to a j-th object location by the particular set of assignments x and zero if $l_i$ is not assigned to the j-th object location by the particular set of assignments x.

The neural network can be a deep convolutional neural network. The neural network can be a deep neural network that comprises an output layer and one or more hidden layers, and training the neural network can include: training the output layer by minimizing a loss function given the optimal set of assignments; and training the hidden layers through backpropagation.

Particular embodiments of the subject matter described in this specification can be implemented so as to realize one or more of the following advantages. A neural network can be trained to effectively predict multiple bounding boxes in an input image, with the confidence score assigned to each bounding box by the neural network accurately reflecting the likelihood that the bounding box contains an image of an object. Additionally, the neural network can be trained to predict the bounding boxes and generate accurate confidence scores while being agnostic to the object category that the objects contained in the bounding boxes belong to.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a system that can train a neural network that is configured to receive an input image and generate data defining a predetermined number of candidate bounding boxes within the input image and, for each candidate bounding box, a confidence score that represents the likelihood that the bounding box contains an image of an object.

Figure 1:
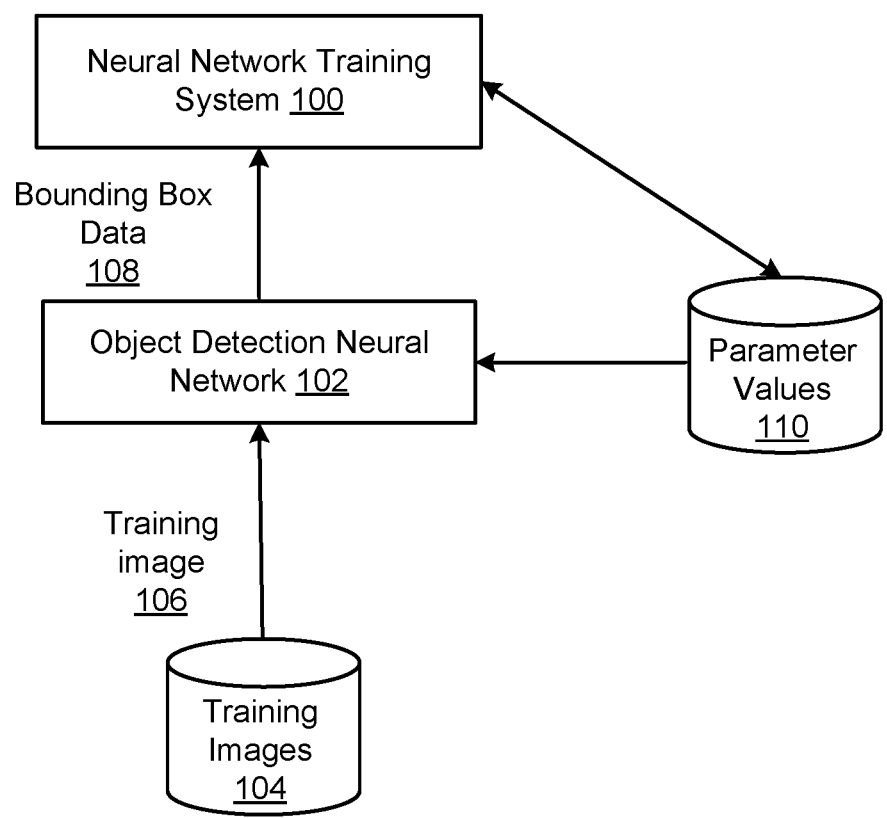
FIG. 1 shows an example neural network training system.

FIG. 1 shows an example neural network training system 100 that is configured to train an object detection neural network 102. The neural network training system 100 is an example of a system implemented as computer programs on one or more computers in one or more locations, in which the systems, components, and techniques described below can be implemented.

The object detection neural network 102 is a neural network that is configured to receive an input image and output bounding box data that defines a predetermined number of candidate bounding boxes within the input image. Generally, the predetermined number will be an integer greater than one, e.g., ten, fifty, or one hundred, so that multiple candidate bounding boxes are defined by the output of the object detection neural network 102 for each input image received by the neural network. Each candidate bounding box covers a portion of the input image at a respective position in the input image. The object detection neural network 102 also outputs, as part of the bounding box data and for each candidate bounding box, a respective confidence score that represents the likelihood that the candidate bounding box contains an image of an object. In particular, the object detection neural network 102 generates the output data for a given input image in accordance with current values of a set of parameters of the neural network, e.g., the current values for each of the parameters stored in a parameter values repository 110. Generally, the object detection neural network 102 is a deep neural network that includes an output layer and one or more hidden layers. For example, the object detection neural network 102 may be a deep convolutional neural network that includes one or more convolutional layers, one or more fully-connected layers, and an output layer, with each convolutional and fully-connected layer applying a transformation to inputs received from the preceding layer in the network in accordance with current values of a respective set of parameters for the layer. Optionally, the deep convolutional neural network can also include other types of neural network layers, e.g., max pooling and regularization layers. The layers that make up an example deep convolutional neural network are described in more detail in *Imagenet classification with deep convolutional neural networks*, Alex Krizhevsky, Ilya Sutskever, and Geoffrey E. Hinton, NIPS, pages 1106-1114, 2012.

The output layer of the object detection neural network 102 receives an input from the preceding layer and applies one or more transformations to the received input to generate the data defining the candidate bounding boxes and the corresponding confidence scores. In some implementations, the output layer applies a linear transformation to the received input to generate, for each of the predetermined number of candidate bounding boxes, data identifying the coordinates of the vertices of the candidate bounding box within the input image. For example, the output layer can generate, for each candidate bounding box, values value that identify the normalized coordinates of the upper-left vertex of the bounding box and values that identify the normalized coordinates of the lower-right vertex of the bounding box. In these implementations, the output layer also applies a linear transformation and then a non-linear transformation to the received input to generate, for each of the candidate bounding boxes, a value that represents the confidence score for the bounding box.

The neural network training system 100 trains the object detection neural network 102 on a set of training images 104 in order to determine trained values of the parameters of the object detection neural network 102. That is, the neural network training system 100 trains the neural network in order to update the values of the parameters in the parameter repository 110 from initial values to trained values. Each training image in the set of training images 104 is associated with object location data that identifies the locations of one or more objects in the training image, i.e., data defining one or more object location bounding boxes within the training image that each includes an image of a respective object.

Generally, in order to train the neural network on a given training image, e.g., a training image 106, the neural network training system 100 provides the training image to the object detection neural network 102 and obtains from the object detection neural network 102 bounding box data, e.g., bounding box data 108 for the training image 106. The bounding box data includes data that defines the predetermined number of candidate bounding boxes within the training image and the confidence score generated by the object detection neural network 102 for each candidate bounding box. The neural network training system 100 updates the current values of the parameters of the object detection neural network 102 using the bounding box data and the object location data associated with the training image that identifies the locations of the objects in the training image. Training the object detection neural network is described in more detail below with reference to FIGS. 2 and 3.

Figure 2:
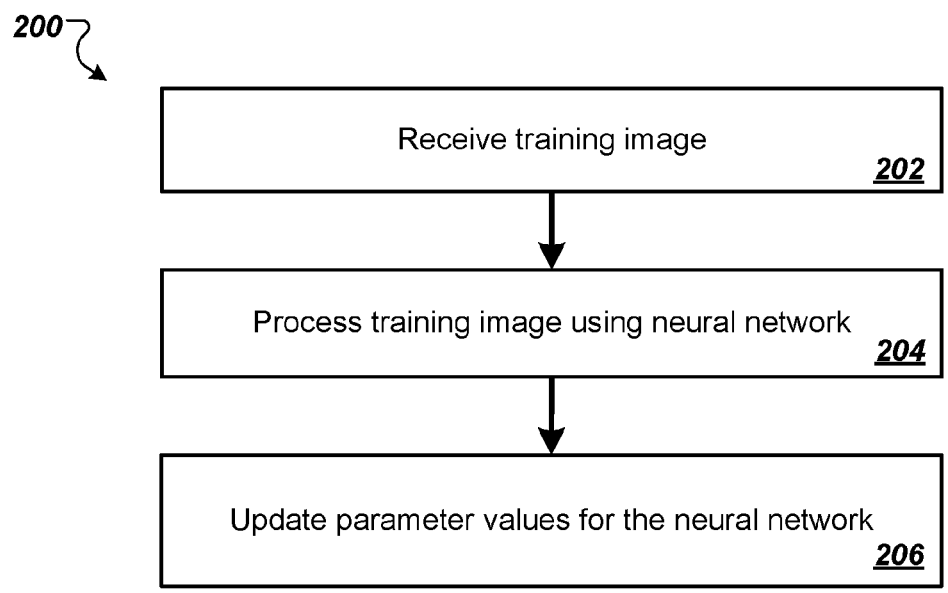
FIG. 2 is a flow diagram of an example process for training a neural network on a training image.

FIG. 2 is a flow diagram of an example process 200 for training a neural network on a training image. For convenience, the process 200 will be described as being performed by a system of one or more computers located in one or more locations. For example, a neural network training system, e.g., the neural network training system 100 of FIG. 1, appropriately programmed, can perform the process 200.

The system can perform the process 200 for each training image in a set of training images as part of a neural network training technique in order to train a neural network, e.g., the object detection neural network 102 of FIG. 1. That is, the system can perform the process 200 for each of the training images in the set of training data in order to determine trained values of the parameters of the neural network.

The system receives a training image (step 202). The training image is associated with object location data that defines one or more object bounding boxes within the training image, with each object bounding box containing an image of a respective object.

The system processes the training image using the neural network (step 204). That is, the system provides the training image to the neural network and obtains from the neural network bounding box data for the training image, i.e., data identifying a predetermined number of candidate bounding boxes within the training image and a confidence score for each candidate bounding box. The confidence score for a given candidate bounding box represents the likelihood that the bounding box contains an image of an object. The neural network generates the bounding box data for the training image in accordance with current values of the parameters of the neural network.

The system updates the values of the parameters of the neural network using the bounding box data and the object location data associated with the training image (step 206). Updating the parameter values of the neural network is described in more detail below with reference to FIG. 3.

Figure 3:
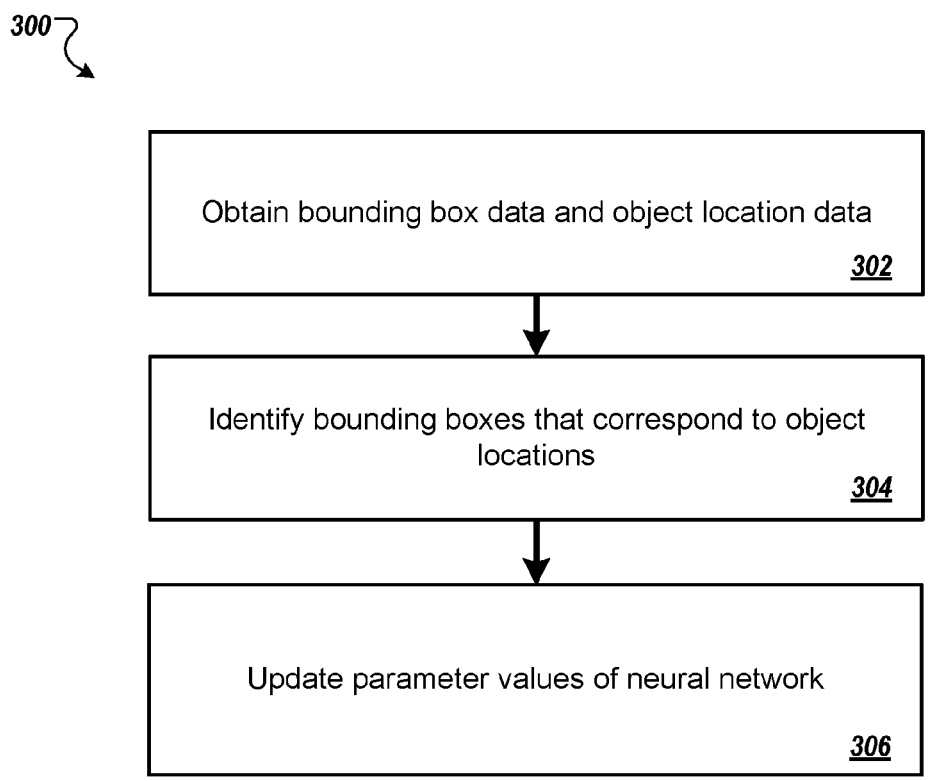
FIG. 3 is a flow diagram of an example process for updating the values of the parameters of a neural network using bounding box data and object location data.

FIG. 3 is a flow diagram of an example process 300 for updating the values of the parameters of a neural network using bounding box data and object location data. For convenience, the process 300 will be described as being performed by a system of one or more computers located in one or more locations. For example, a neural network training system, e.g., the neural network training system 100 of FIG. 1, appropriately programmed, can perform the process 300.

The system obtains bounding box data and object location data for a training image (step 302).

The system identifies candidate bounding boxes identified by the neural network that correspond to object locations identified in the object location data for the training image (step 304). That is, the system determines, for each object location, a respective candidate bounding box that corresponds to the object location. In particular, the system performs a bipartite matching to generate an optimal set of assignments that assigns a respective candidate bounding box to each object location associated with the training image. As part of the bipartite matching, the system selects as the optimal set of assignments the set that minimizes a loss function that includes a localization loss term and a confidence loss term. For example, the system may select the set of assignments x* that satisfies:

$$x^* = \operatorname*{argmin}_{x} F(x, l, c),$$

where $F(x,l,c)$ is the loss function, x is a set of assignments, l is a candidate bounding box, and c is the confidence score for the candidate bounding box, and where the minimization is subject to the constraint that each set of assignments x must assign exactly one candidate bounding box to each object location. In some implementations, the loss function satisfies:

$$F(x,l,c) = \alpha F_{loc}(x,l) + F_{conf}(x,c),$$

where α is a constant value, $F_{loc}$ is the location loss and $F_{conf}$ is the confidence loss.

Generally, the location loss for a given set of assignments is based on, for each candidate bounding box that is assigned to an object location by the set of assignments, the distance in the training image between the candidate bounding box and the object location that the candidate bounding box is assigned to. For example, the location loss for a given set of assignments x may satisfy:

$$F_{loc}(x, l) = \sum_{i,j} \cdot 5 x_{ij} \|l_i - g_j\|_2^2$$

where i ranges from 1 to the total number of candidate bounding boxes, j ranges from 1 to the total number of object locations, $l_i$ is the i-th candidate bounding box, $g_j$ is the j-th object location, $x_{ij}$ equals one if li is assigned to $g_j$ in the set of assignments x and zero if li is not assigned to $g_j$ in the set of assignments x, and $\|l_i - g_j\|_2$ is the $L_2$ distance between the normalized coordinates of $l_i$ and the normalized coordinates of $g_j$.

Generally, the confidence loss for a given set of assignments is based on, for each candidate bounding box that is assigned to an object location by the given set of assignments, how close the confidence score for the candidate bounding box is to a first target confidence score for candidate bounding boxes that are assigned to object locations, e.g., a score of one. The confidence loss for a given set of assignments is also based on, for each candidate bounding box that is not assigned to an object location by the given set of assignments, how close the confidence score for the candidate bounding box is to a second target confidence score for candidate bounding boxes that are not assigned to object locations, with the second target confidence score being lower than the first target confidence score e.g., the second target score being zero if the first target confidence score is one. For example, the confidence loss for a given set of assignments x may satisfy:

$$F_{con}(x, c) = -\sum_{i,j} x_{ij} \log(c_i) - \sum_{i} \left(1 - \sum_{j} x_{ij}\right) \log(1 - c_i),$$

where i ranges from 1 to the total number of candidate bounding boxes, j ranges from 1 to the total number of object locations, $c_i$ is the confidence score for the i-th candidate bounding box, and $x_{ij}$ equals one if $l_i$ is assigned to a j-th object location by the set of assignments x and zero if $l_i$ is not assigned to the j-th object location by the set of assignments x.

The system updates the values of the parameters of the neural network using the optimal set of assignments (step 306). Generally, the system updates the values of the parameters of the neural network to minimize the loss function, given that the set of assignments is the optimal set of assignments. Thus, the system updates the values of the parameters so that the distances between the candidate bounding boxes and the object locations to which the candidate bounding boxes are assigned by the optimal set of assignments are reduced, the confidence scores for candidate bounding boxes that are assigned to an object location by the optimal set of assignments are increased, and the confidence scores for candidate bounding boxes that are not assigned to an object location by the optimal set of assignments are decreased.

In particular, the system updates the values of the parameters by performing an iteration of a backpropagation neural network training procedure, e.g., a stochastic gradient descent backpropagation training technique, to determine the updated values of the parameters of the neural network.

That is, the system backpropagates the error computed for the output of the output layer through to each layer below the output layer in the neural network in order to adjust the parameters of each of the neural network layers.

Thus, by performing the backpropagation neural network training procedure for each training image in the set of training images, the system trains the neural network to accurately determine, for an input image for which object locations are not known by the system, which of the candidate bounding boxes identified by the bounding box data generated by the neural network for the input image are likely to contain an image of an object, and for each of those candidate bounding boxes, to locate the candidate bounding box accurately in the portion of the image that contains the image of the object.

In some implementations, prior to identifying the candidate bounding boxes identified by the neural network for a given training image that correspond to object locations in the training image, the system clusters the object locations to determine a set of object location clusters that the system can use as priors for each of the candidate bounding boxes. Additionally, in some implementations, the system matches each object location to one of the priors rather than matching the candidate bounding boxes to the object locations.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system for detecting objects in images, the system comprising:
   an object detection neural network implemented by one or more computers, the object detection neural network comprising:
      one or more hidden neural network layers configured to:
         receive an input image, and
         process the input image to generate a hidden layer output; and
      an output layer configured to:
         receive the hidden layer output,
         apply a first transformation to the hidden layer output to generate a first output that defines a predetermined number of bounding boxes in the input image, and
         apply one or more second transformations to the hidden layer output to generate a second output that includes a respective confidence score for each of the bounding boxes that represents a likelihood that the bounding box contains an image of an object.

2. The system of claim 1, wherein the first transformation is a linear transformation.

3. The system of claim 1, wherein the one or more second transformations comprise a linear transformation followed by a non-linear transformation.

4. The system of claim 1, wherein the first output comprises, for each of the bounding boxes, first values that identify coordinates of a first vertex of the bounding box in the input image and second values that identify coordinates of a second vertex of the bounding box in the input image.

5. The system of claim 1, wherein the one or more hidden neural network layers comprise one or more convolutional neural network layers and one or more fully-connected neural network layers.

6. The system of claim 1, wherein the predetermined number is an integer greater than one.

7. The system of claim 1, wherein the output layer and the one or more hidden layers have been trained through back-propagation.

8. One or more non-transitory computer storage media storing instructions that when executed by one or more computers cause the one or more computers to implement an object detection neural network, the object detection neural network comprising:
   one or more hidden neural network layers configured to:
      receive an input image, and
      process the input image to generate a hidden layer output; and
   an output layer configured to:
      receive the hidden layer output,
      apply a first transformation to the hidden layer output to generate a first output that defines a predetermined number of bounding boxes in the input image, and
      apply one or more second transformations to the hidden layer output to generate a second output that includes a respective confidence score for each of the bounding boxes that represents a likelihood that the bounding box contains an image of an object.

9. The computer storage media of claim 8, wherein the first transformation is a linear transformation.

10. The computer storage media of claim 8, wherein the one or more second transformations comprise a linear transformation followed by a non-linear transformation.

11. The computer storage media of claim 8, wherein the first output comprises, for each of the bounding boxes, first values that identify coordinates of a first vertex of the bounding box in the input image and second values that identify coordinates of a second vertex of the bounding box in the input image.

12. The computer storage media of claim 8, wherein the one or more hidden neural network layers comprise one or more convolutional neural network layers and one or more fully-connected neural network layers.

13. The computer storage media of claim 8, wherein the predetermined number is an integer greater than one.

14. The computer storage media of claim 8, wherein the output layer and the one or more hidden layers have been trained through backpropagation.

15. A method performed by one or more computers, the method comprising:
   receiving an input image;
   processing the input image using one or more hidden neural network layers that are configured to:
   receive the input image, and
   process the input image to generate a hidden layer output; and
   processing the hidden layer output using an output layer that is configured to:
   receive the hidden layer output,
   apply a first transformation to the hidden layer output to generate a first output that defines a predetermined number of bounding boxes in the input image, and
   apply one or more second transformations to the hidden layer output to generate a second output that includes a respective confidence score for each of the bounding boxes that represents a likelihood that the bounding box contains an image of an object.

16. The method of claim 15, wherein the first transformation is a linear transformation.

17. The method of claim 15, wherein the one or more second transformations comprise a linear transformation followed by a non-linear transformation.

18. The method of claim 15, wherein the first output comprises, for each of the bounding boxes, first values that identify coordinates of a first vertex of the bounding box in the input image and second values that identify coordinates of a second vertex of the bounding box in the input image.

19. The method of claim 15, wherein the one or more hidden neural network layers comprise one or more convolutional neural network layers and one or more fully-connected neural network layers.

20. The method of claim 15, wherein the predetermined number is an integer greater than one.

* * * * *